(12) United States Patent
Stanley

(10) Patent No.: US 9,726,903 B2
(45) Date of Patent: Aug. 8, 2017

(54) EYEWEAR WITH IMPROVED FIT

(75) Inventor: Glen E. Stanley, Woodstock, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 749 days.

(21) Appl. No.: 12/879,418

(22) Filed: Sep. 10, 2010

(65) Prior Publication Data

US 2012/0062832 A1     Mar. 15, 2012

(51) Int. Cl.
*G02C 5/12*     (2006.01)
(52) U.S. Cl.
CPC ..................... *G02C 5/12* (2013.01)
(58) Field of Classification Search
CPC .................... G02C 6/12; G02C 5/12
USPC ..................... 351/76–82, 136–139
See application file for complete search history.

(56) References Cited

U.S. PATENT DOCUMENTS

| | | | |
|---|---|---|---|
| 2,552,122 A | 5/1951 | Splaine | |
| 2,599,789 A * | 6/1952 | Splaine | 29/20 |
| 4,741,611 A | 5/1988 | Burns | |
| 4,762,407 A | 8/1988 | Anger | |
| D325,886 S | 5/1992 | Chia et al. | |
| D329,662 S | 9/1992 | Spong | |
| 5,280,570 A | 1/1994 | Jordan | |
| 5,347,323 A * | 9/1994 | Wilson | 351/44 |
| 5,406,337 A | 4/1995 | Metcalfe | |
| D365,591 S | 12/1995 | Jannard et al. | |
| D367,439 S | 2/1996 | Bartholomay | |
| 5,576,778 A | 11/1996 | Fujie | |
| 5,617,155 A | 4/1997 | Ducarouge | |
| D418,536 S | 1/2000 | Flanagan | |
| D420,027 S | 2/2000 | Hall | |
| D424,093 S | 5/2000 | Chen | |
| 6,074,058 A | 6/2000 | Anger | |
| 6,533,418 B1 | 3/2003 | Izumitani et al. | |
| D474,800 S | 5/2003 | Hou | |
| 6,601,955 B1 | 8/2003 | Le Van Meautte | |
| D485,856 S | 1/2004 | Wolfe | |
| 6,813,033 B2 | 11/2004 | Farcy et al. | |
| D514,614 S | 2/2006 | Yang | |
| D521,895 S | 5/2006 | Scharr | |
| D523,890 S | 6/2006 | Chen | |
| D524,844 S | 7/2006 | Yang | |

(Continued)

FOREIGN PATENT DOCUMENTS

| | | |
|---|---|---|
| BE | 894660 | 1/1983 |
| CN | 101144915 | 3/2008 |

(Continued)

OTHER PUBLICATIONS

US 5,706,337, Sep. 12, 1995, Kikuchi (withdrawn).

(Continued)

*Primary Examiner* — Huy K Mai

(57) ABSTRACT

Eyewear for a person includes at least a frame for supporting at least one lens; and a nose bridge affixed to the frame. The nose bridge has first and second nose pads adapted for contact with first and second sides of a person's nose, wherein the nose pads are retained in a fixed position relative to the frame at a sagittal angle A of greater than 38 degrees. The eyewear may be safety glasses, goggles, sunglasses, cosmetic glasses, and/or vision correction glasses. The eyewear may include only one lens, or may include two separate lenses.

21 Claims, 3 Drawing Sheets

(56) References Cited

U.S. PATENT DOCUMENTS

| | | | |
|---|---|---|---|
| 7,096,514 B2 | 8/2006 | Khulusi | |
| 7,159,984 B2 | 1/2007 | Fukuma | |
| D561,234 S | 2/2008 | Sheldon | |
| D566,746 S | 4/2008 | Chen | |
| 7,380,934 B1 * | 6/2008 | Wang Lee | 351/137 |
| D579,478 S | 10/2008 | Chen | |
| D582,959 S | 12/2008 | Yang | |
| D590,004 S | 4/2009 | Tu | |
| 7,527,376 B2 * | 5/2009 | Kamishita et al. | 351/159.76 |
| D600,268 S | 9/2009 | Masui | |
| 7,588,335 B2 | 9/2009 | Kubitza | |
| D603,444 S | 11/2009 | Yasuhara | |
| D607,483 S | 1/2010 | Yang | |
| 7,648,235 B1 | 1/2010 | Rosenfeld et al. | |
| D614,685 S | 4/2010 | Moritz | |
| D624,579 S | 9/2010 | Rohrbach | |
| 7,810,924 B2 | 10/2010 | Dellapina | |
| D628,229 S | 11/2010 | Fuchs | |
| 7,874,079 B2 * | 1/2011 | Andrews et al. | 33/507 |
| D634,350 S | 3/2011 | Yang | |
| 8,091,244 B2 * | 1/2012 | Andrews et al. | 33/507 |
| 2009/0051868 A1 * | 2/2009 | Kwan | 351/137 |
| 2009/0262302 A1 | 10/2009 | Chauveau | |
| 2009/0268199 A1 | 10/2009 | Inoguchi | |
| 2009/0310080 A1 | 12/2009 | Dellapina | |
| 2010/0064533 A1 | 3/2010 | Miyashita | |
| 2010/0103367 A1 | 4/2010 | Lee | |
| 2010/0128220 A1 | 5/2010 | Chauveau | |
| 2010/0177186 A1 | 7/2010 | Baranton | |
| 2010/0238395 A1 * | 9/2010 | Laustsen et al. | 351/117 |

FOREIGN PATENT DOCUMENTS

| | | |
|---|---|---|
| DE | 3518215 | 9/1987 |
| EP | 1 14283 | 10/1986 |
| EP | 1 316 837 | 11/2002 |
| GB | 862087 | 3/1961 |
| JP | S50-108932 | 8/1975 |
| JP | 2-48920 | 4/1990 |
| JP | 05-061005 | 3/1993 |
| JP | H05-061004 | 3/1993 |
| JP | 05-094704 | 12/1993 |
| JP | 3004407 | 5/1994 |
| JP | 11142796 | 5/1999 |
| JP | 2000-066152 | 3/2000 |
| JP | 2005-258037 | 9/2005 |
| JP | 2005-258038 | 9/2005 |
| JP | 2006-113252 | 4/2006 |
| JP | 2006-343433 | 12/2006 |
| JP | 2005-084664 | 10/2008 |
| JP | 11048357 | 8/2009 |
| JP | 2009175717 | 8/2009 |
| JP | 2009-210952 | 9/2009 |
| JP | 2010-048912 | 3/2010 |
| JP | 2006-017886 | 1/2011 |
| TW | 158378 | 5/1991 |
| TW | M247855 | 10/2004 |
| TW | M283195 | 12/2005 |
| TW | M289487 | 4/2006 |
| TW | M290253 | 5/2006 |
| TW | 2009-12423 | 3/2009 |
| WO | WO 03/087916 | 10/2003 |
| WO | WO 2005038511 | 4/2005 |
| WO | WO 2007012261 | 2/2007 |
| WO | WO 2007036288 | 4/2007 |
| WO | WO 2008003897 | 3/2008 |

OTHER PUBLICATIONS

Yang, C.Y., et al., "Facial Measurements for Frame Design," Optometry and Vision Science, vol. 75, No. 5, Apr. 1998, pp. 288-292.

Yang, C.Y., et al., "Opthalmic Anthropometry for Hong Kong Chinese Adults," Optometry and Vision Science, vol. 75, No. 5, Apr. 1998, pp. 293-301.

International Search Report for International Publication No. PCT/US2011/049256, dated Oct. 12, 2011.

U.S. Appl. No. 29/369,603, entitled Eyewear Keystone Feature, filed Sep. 10, 2010.

U.S. Appl. No. 29/369,602, entitled Eyewear Lens Feature, filed Sep. 10, 2010.

U.S. Appl. No. 29/369,607, entitled Eyewear Transition Feature, filed Sep. 10, 2010.

European Application No. 11823953 Search Report dated Feb. 20, 2014.

* cited by examiner

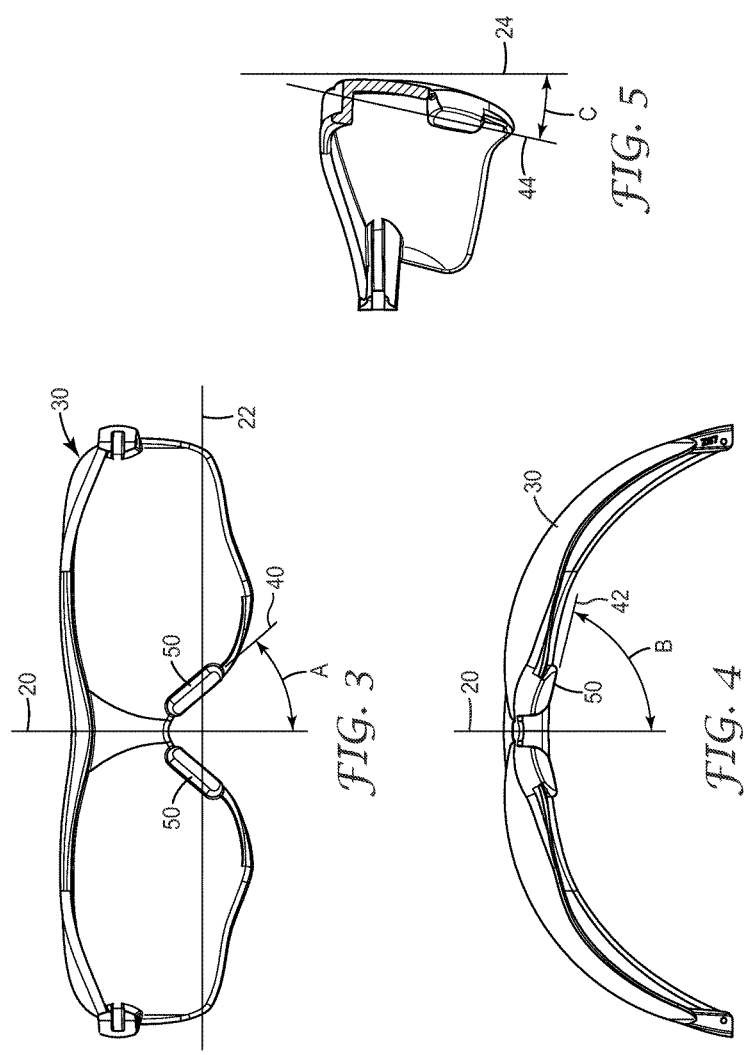

EYEWEAR WITH IMPROVED FIT

TECHNICAL FIELD

Eyewear for a person that exhibits improved fit, in particular relative to the nose of a wearer.

BACKGROUND OF THE INVENTION

Eyeglasses, which are intended to correct a person's vision to normal or near-normal, and safety glasses, which are intended to protect a person's eyes from harm, have been known for centuries. Both types of eyewear typically rest on the nose, and on each ear of a person. A person's perception of how well a pair of glasses fit is influenced primarily by how well the glasses fit on the nose and over the ears, perhaps together with whether the lenses of the glasses are too close to the person's eyes or face, or other factors.

One method used to improve the fit of glasses is to provide two nose pads, one of which contacts each side of a person's nose, and to mount each nose pad on a small, flexible spring or wire referred to as a pad arm. The pad arm can then be permanently deformed by an optical professional so that each nose pad contacts its respective side of the person's nose at an acceptable position. If a person puts on the glasses in a slightly different manner, or in a slightly different location, the pad arm can resiliently deform to provide minor but automatic adjustments in use.

Glasses with pad arm nose pads are widely used, but they have some known problems. First, they are more expensive than fixed nose-bridge glasses, which can be mass-produced with a pad or pads at predetermined positions. Second, they typically require that an optical professional spend several minutes making manual adjustments to the pad arms before they can be given to a person for use, which increases the staffing requirements and costs of the optical business. Third, if the glasses are struck or crushed, the spring or wire pad arm supporting a nose pad may be permanently deformed, which typically requires the wearer to return to the office of an optical professional to have the glasses fixed and re-fit.

Glasses with fixed nose bridges have also been widely used, in particular, as sun glasses or safety glasses. The fixed nose bridge is designed to fit a typical person's nose, and although the fit may not be highly satisfactory, the cost of the glasses is often low enough that users are willing to trade comfort for cost-savings. However, it would be desirable to provide glasses for a person that provide an improved fit, particularly in the nose area, without increasing the costs of the glasses or requiring manual adjustments by an optical professional.

Certain prior techniques for attempting to improve the fit of certain types of glasses are described in U.S. Pat. No. 4,762,407 (Anger et al.), U.S. Pat. No. 6,074,058 (Anger), and U.S. Pat. No. 7,648,235 (Rosenfield).

SUMMARY OF THE INVENTION

In one embodiment of the present invention, eyewear for a person is disclosed, comprising a frame for supporting at least one lens; and a nose bridge affixed to the frame, wherein the nose bridge comprises first and second nose pads adapted for contact with first and second sides of a person's nose, wherein the nose pads are retained in a fixed position relative to the frame at a sagittal angle A of greater than 38 degrees. In another embodiment, the sagittal angle A is between 41 degrees and 43 degrees. In yet another embodiment, the sagittal angle A is greater than 41 degrees, and the nose pads are also retained in a fixed position at a transverse angle B of greater than 25 degrees. In a further embodiment, the sagittal angle A is between 41 degrees and 43 degrees, and the nose pads are also retained in a fixed position at a transverse angle B of between 27 degrees and 29 degrees.

The eyewear of the present invention may be safety glasses, goggles, sunglasses, cosmetic glasses, and/or vision correction glasses. The eyewear may include only one lens, or may include two separate lenses. These and other features of the invention are described in detail below.

BRIEF DESCRIPTION OF THE DRAWINGS

The present invention is described with reference to the Figures, in which identical structures are identified by identical reference numbers among two or more Figures, and in which:

FIG. 3 is a rear view of a pair of fixed nose-bridge eyewear according to the present invention;

FIG. 4 is a bottom view of a pair of fixed nose-bridge eyewear according to the present invention; and FIG. 5 is a side view of a pair of fixed nose-bridge eyewear according to the present invention.

In one embodiment of the present invention, the glasses and their components shown in the Figures are not proportionally accurate, but in other embodiments of the present invention the glasses and their components shown in the Figures are proportionally accurate and the Figures may be used to exemplify certain angles, relative distances, or other relationships directly.

DETAILED DESCRIPTION OF THE INVENTION

The present inventors have determined that by controlling certain critical parameters, within ranges not believed to have been identified previously, glasses with fixed nose-bridges can provide fit that users perceive as a significant improvement over conventional fixed nose-bridge glasses. In particular, if fixed nose-bridges are designed so that they exhibit one, two, or three critical parameters as described below, the fit of the glasses on the user's nose is thought to be significantly improved. These and other aspects of the invention will be described in detail herein.

Figure 1:
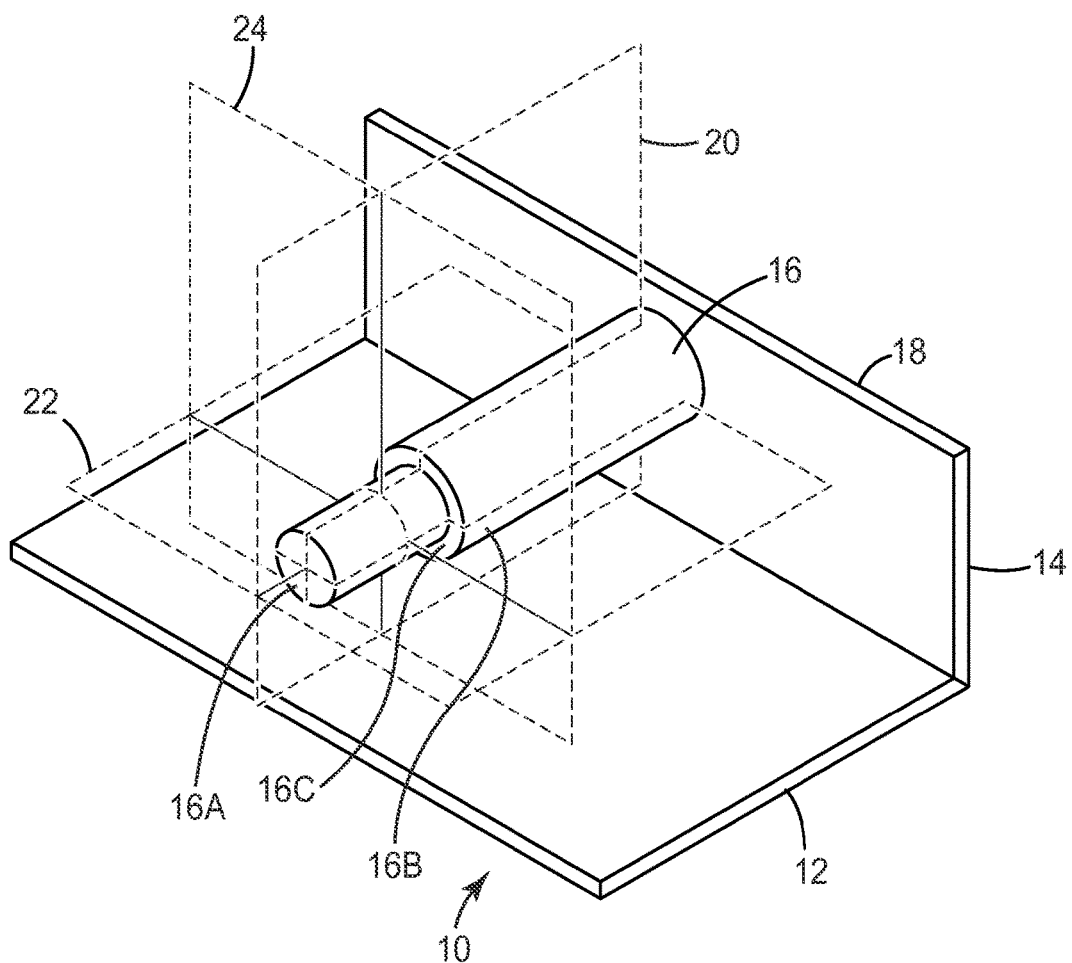
FIG. 1 is an elevated perspective view of a fixture used in connection with the present invention.
Figure 2:
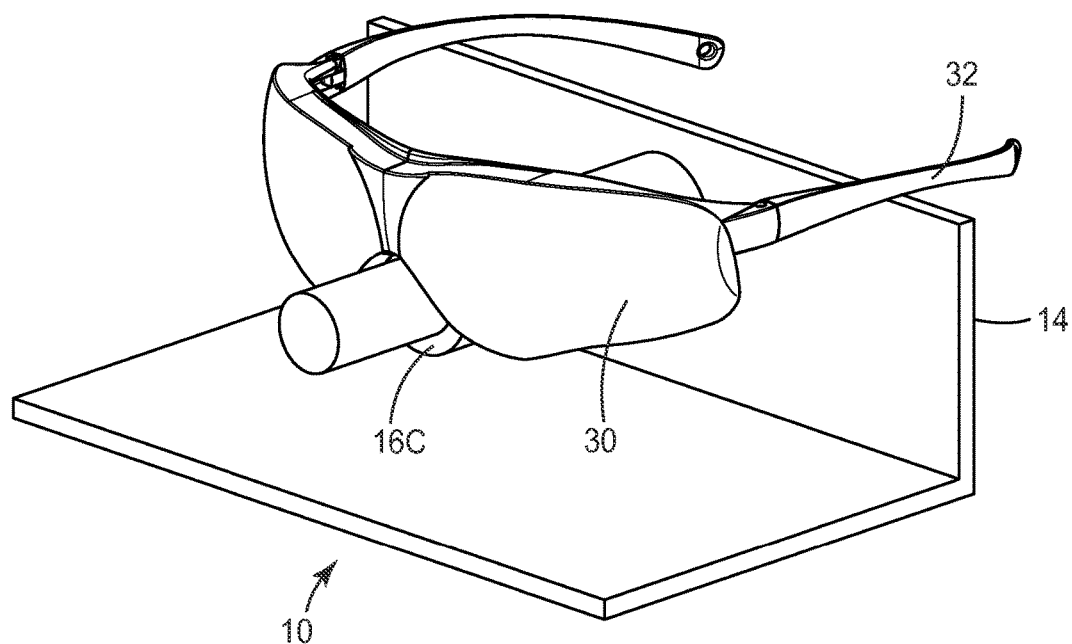
FIG. 2 is an elevated perspective view of a pair of fixed nose-bridge eyewear positioned on the fixture shown in FIG. 1.

To facilitate a complete understanding of the present invention, certain terms will be used to reference particular angular relationships that are thought to be critical to the successful implementation of various embodiments of the present invention. FIG. 1 shows a fixture or jig on which almost any pair of eyewear may be placed, as shown in FIG. 2. By using a fixture of this type, the angles or distances or other dimensional characteristics for almost any pair of eyewear can be compared on an equivalent basis.

Fixture 10 is illustrated in detail in FIG. 1. The fixture includes a base plate 12 and a back plate 14 attached to the base plate so that the back plate extends vertically, perpendicular to the base plate. The base plate 12 measures 200 millimeters (mm) wide and 125 mm deep, and the back plate measures 200 mm wide and 70 mm high. A support pin 16 is affixed to the back plate midway along its width, with the center of the support pin being 22.8 mm below the top of the back plate. The support pin extends above and parallel to the base plate for a total distance of 125 mm. The base portion 16B of the support pin has a length of 86.6 mm and a diameter of 30 mm, and the nose pad support portion 16A has a length of 38.4 mm and a diameter of 20 mm. The change in diameter between the nose pad support portion 16A and base portion 16B acts as a stop 16C for positioning eyewear to be evaluated, when the eyewear are pushed toward the back plate until they touch the stop. The top 18 of the back plate acts as a support for the eyewear bows or stems.

Three reference planes, defined relative to the test fixture 10, are used to determine certain angles associated with eyewear. With the base plate positioned horizontally and viewing the fixture from the free end of support pin (which may be referred to as the front of the fixture), the sagittal plane 20 bisects or divides the support pin 16 vertically into imaginary left and right halves. The transverse plane 22 bisects the support pin 16 horizontally into imaginary upper and lower halves. And the frontal plane 24 is orthogonal to both the sagittal and transverse planes, tangent to the most forward portion of the lens surface.

Certain angles measured relative to these planes will be described in further detail below, with reference to FIGS. 3, 4, and 5.

FIG. 2 illustrates a representative pair of eyewear 30 positioned on the fixture 10 that is shown in FIG. 1. The eyewear have been pushed up against stop 16C, and the bows or stems 32 rest on top 18 of back plate 18, which places the eyewear generally in the position they would occupy when worn by a person. Eyewear may include a single structure that extends over the bridge of the nose and provides a nose pad on each side of a wearer's nose, or an individual, separate nose pad structure on each side, and those arrangements are considered to be equivalent for purposes of the present invention. With each pair of eyewear positioned as shown certain angles measured from one pair of eyewear can be compared to the corresponding angle measured from another pair of eyewear, even if their construction is not identical.

FIGS. 3, 4, and 5 illustrate the relevant portions of a pair of eyewear 30 designed in accordance with the present invention, as well as sagittal plane 20, transverse plane 22, and frontal plane 24. For clarity, the test fixture 10 is not shown, but the three planes are illustrated as though the eyewear 30 were positioned on the fixture as shown in FIG. 2. Sagittal angle A is illustrated in FIG. 3, and it is defined as the angle between the sagittal plane 20 and nose pad surface 50, extending parallel to the frontal plane 24. Transverse angle B is illustrated in FIG. 4, and it is defined as the angle between the sagittal plane 20 and the nose pad surface 50, extending parallel to the transverse plane 22. Frontal angle C is illustrated in FIG. 5, and it is defined as the angle between the nose pad surface and the frontal plane 24, extending parallel to the sagittal plane 20. In each case, for measurement purposes the nose pad surface was considered to be a flat surface tangential to the bearing surface of the nose pad. The angles described above assume that the eyewear are symmetrical, and that only half of the angle described needs to be measured, but it is also clearly within the scope of the invention to measure the entire angle directly (for example in the case of the sagittal angle A, measuring from one nose pad to the opposite nose pad). Furthermore, it is assumed that the nose pads for each side of the nose are symmetrical, but variations that typically occur in manufacturing may occur.

Using the angles specified above, the present inventors have determined that the optimal range(s) for the nose pad surfaces of fixed nose-bridge eyewear for a certain population of people are as follows:

Sagittal angle A: preferably greater than 38 degrees, more preferably greater than 41 degrees, and most preferably between 41 degrees and 43 degrees.

Transverse angle B: preferably greater than 25 degrees, more preferably greater than 27 degrees, and most preferably between 27 degrees and 29 degrees.

Frontal angle C: preferably between 12 degrees and about 16 degrees, and most preferably between about 13 degrees and about 14 degrees.

Each of the angles identified above, and each combination of two or all three of these angles is believed to be critical to the performance of certain embodiments of the claimed invention. Specifically, in one embodiment, the sagittal angle A is a critical parameter. In another embodiment, sagittal angle A and transverse angle B are both critical parameters. In a further embodiment, angle B is a critical parameter, and so on. Fixed nose-bridge eyewear having one, or two, or all three angles within the ranges specified have been found to provide a better fit for certain people having facial characteristics thought to be typical of people of Asian descent. More significantly, fixed nose-bridge eyewear said to be designed for "Asian-fit" in the past do not exhibit the angles described and claimed herein, and in fact appear not even to exhibit angles close to the invention described and claimed herein. This is explained with reference to an example of a pair of fixed nose-bridge eyewear made in accordance with the present invention, compared to a number of pairs of fixed nose-bridge eyewear that are currently publicly available, as described in detail below.

EXAMPLES

Example 1

An example of fixed nose-bridge eyewear according to the present invention were injection molded using a optical thermoplastic polycarbonate polymer. The nose pads were formed integrally with the frame of the eyewear, which were designed for use as safety glasses. The nose pads had a 4.6 mm×14.9 mm approximately rectangular bearing surface with an area of 68.5 mm². Nose pads were set in the frame of the glasses at a fixed spatial orientation and spaced 19 mm apart from their centers. The stems of the eyewear were spaced 99.1 mm apart.

The sagittal, transverse, and frontal angles of the exemplary eyewear described above were measured and are shown in Table 1. The eyewear as described was believed to be well-suited for a typical Asian face, and when Asian wearers tested the fit of the glasses according to this embodiment of the present invention, the glasses were subjectively thought to fit well.

Comparative Examples

Several pairs of eyewear with fixed nose pads that are currently commercially available were evaluated relative to the three angles described above. The results are shown in Table 1.

TABLE 1

| Maker/Model (if available) | Obtained from: | Example | DISTANCE Between Pads | ANGLE A | ANGLE B | ANGLE C |
|---|---|---|---|---|---|---|
| Example of Present Invention | | E1 | 19.7 mm | 42.° | 28° | 13° |
| Oakley (Asian Fit) Model # 03-324 | USA (www.MBstores.com) | C1 | 17.2 mm | 16° | 12° | 29° |
| Nike Skylon Exp.R (Asian Fit) Model # Ev0153403 | USA (www.MBstores.com) | C2 | 12.6 mm | 25° | 8° | 34° |
| Sperian | USA | C3 | 18.0 mm | 33° | 12° | 12° |
| Yamamoto Model # 337S | Japan | C4 | 16.9 mm | 27° | 4° | 11° |
| Yamamoto Model # SN-730 | Japan | C5 | 16.0 mm | 31° | 7° | 16° |
| Riken Model # RSX-IIB | Japan | C6 | 12.9 mm | 25° | 1° | −2° |
| Riken Model # 80B | Japan | C7 | 17.4 mm | 25° | 8° | 17° |
| Worksafe Strider II | Korea | C8 | 17.9 mm | 27° | 13° | 12° |
| Otis Model # 701 | Korea | C9 | 13.1 mm | 31° | 18° | 9° |

As is evident in the evaluation results, the eyewear of the present invention have fixed-position nose pads at angular positions much different from the other eyewear measured. More importantly, the special positioning of the nose pads of the present invention are believed to be directly responsible for the improved fit of the eyewear of the present invention, and accordingly the data presented above is believed to represent a significant improvement in the field.

The eyewear of the present invention has now been described with reference to several different embodiments, which are intended to exemplify the present invention, but not to limit it. For example, the eyewear may include only a single lens extending across the user's field of view, or may include two separate lenses. The eyewear may be safety glasses, sunglasses, glasses for the correction of vision, goggles, or a combination of these and other types of glasses.

I claim:

1. Eyewear for a person, comprising:
   a) a frame for supporting at least one lens; and
   b) a nose bridge affixed to the frame, wherein the nose bridge comprises first and second nose pads adapted for contact with first and second sides of a person's nose, wherein the nose pads are retained in a fixed position relative to the frame at a sagittal angle A of greater than 41 degrees and a transverse angle B of greater than 25 degrees.

2. The eyewear of claim 1, wherein the sagittal angle A is between 41 degrees and 43 degrees.

3. The eyewear of claim 1, wherein the sagittal angle A is between 41 degrees and 43 degrees, and the nose pads are also retained in a fixed position at a transverse angle B of between 27 degrees and 29 degrees.

4. The eyewear of claim 1, wherein the eyewear are safety glasses.

5. The eyewear of claim 1, wherein the eyewear are sunglasses.

6. The eyewear of claim 1, wherein the eyewear are vision correction glasses.

7. The eyewear of claim 1, wherein the eyewear are goggles.

8. The eyewear of claim 1, wherein the eyewear are cosmetic glasses.

9. The eyewear of claim 1, comprising only one lens.

10. The eyewear of claim 1, comprising two separate lenses.

11. Eyewear for a person, comprising:
    a) a frame for supporting at least one lens; and
    b) a nose bridge affixed to the frame, wherein the nose bridge comprises first and second nose pads adapted for contact with first and second sides of a person's nose, wherein the nose pads are fixed in a predetermined position relative to the frame at a sagittal angle A of greater than 38 degrees.

12. The eyewear of claim 11, wherein the sagittal angle A is between 41 degrees and 43 degrees.

13. The eyewear of claim 11, wherein the sagittal angle A is greater than 41 degrees, and the nose pads are also retained in a fixed position at a transverse angle B of greater than 25 degrees.

14. The eyewear of claim 11, wherein the sagittal angle A is between 41 degrees and 43 degrees, and the nose pads are also retained in a fixed position at a transverse angle B of between 27 degrees and 29 degrees.

15. The eyewear of claim 11, wherein the eyewear are safety glasses.

16. The eyewear of claim 11, wherein the eyewear are sunglasses.

17. The eyewear of claim 11, wherein the eyewear are vision correction glasses.

18. The eyewear of claim 11, wherein the eyewear are goggles.

19. The eyewear of claim 11, wherein the eyewear are cosmetic glasses.

20. The eyewear of claim 11, comprising only one lens.

21. The eyewear of claim 11, comprising two separate lenses.

* * * * *